United States Patent
Durandeau et al.

(10) Patent No.: US 9,102,565 B2
(45) Date of Patent: Aug. 11, 2015

(54) MATERIAL AND GLAZING COMPRISING SAID MATERIAL

(75) Inventors: Anne Durandeau, Paris (FR); Andriy Kharchenko, Palaiseau (FR); Bruno Mauvernay, Paris (FR); Emilie Thollas, Ermont (FR); Etienne Sandre-Chardonnal, Paris (FR); Pierre-Alain Gillet, Mareil-Marly (FR); Ulrich Billert, La Celle Saint-Cloud (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 57 days.

(21) Appl. No.: 13/394,249

(22) PCT Filed: Sep. 7, 2010

(86) PCT No.: PCT/FR2010/051852
§ 371 (c)(1),
(2), (4) Date: Mar. 5, 2012

(87) PCT Pub. No.: WO2011/030049
PCT Pub. Date: Mar. 17, 2011

(65) Prior Publication Data
US 2012/0164443 A1 Jun. 28, 2012

(30) Foreign Application Priority Data
Sep. 8, 2009 (FR) ................................. 09 56096

(51) Int. Cl.
B32B 15/04 (2006.01)
B32B 17/06 (2006.01)
C03C 17/34 (2006.01)
C03C 17/36 (2006.01)

(52) U.S. Cl.
CPC ............. *C03C 17/3435* (2013.01); *C03C 17/36* (2013.01); *C03C 17/366* (2013.01); *C03C 17/3618* (2013.01); *C03C 17/3626* (2013.01); *C03C 17/3649* (2013.01); *C03C 17/3652* (2013.01); *C03C 17/3681* (2013.01); *C03C 2217/71* (2013.01); *Y10T 428/265* (2015.01)

(58) Field of Classification Search
CPC .......... B32B 9/00; B32B 15/00; B32B 15/04; B32B 17/00; B32B 17/06; B32B 2255/06; B32B 2255/205; B32B 2255/28; B32B 2255/00; C03C 15/00; C03C 17/00; C03C 17/06; C03C 17/23; C03C 17/3411; C03C 17/34; C03C 17/36; C03C 17/3602; C03C 17/3604; C03C 17/3607; C03C 17/3613; C03C 17/3615; C03C 17/3639

USPC ......... 428/428, 432, 688, 689, 701, 702, 426, 428/433, 699
See application file for complete search history.

(56) References Cited

U.S. PATENT DOCUMENTS

| | | | |
|---|---|---|---|
| 6,055,088 A | 4/2000 | Fix et al. | |
| 6,833,089 B1 | 12/2004 | Kawahara et al. | |
| 7,081,301 B2 * | 7/2006 | Stachowiak | 428/428 |
| 7,323,249 B2 * | 1/2008 | Athey et al. | 428/432 |
| 7,405,004 B2 * | 7/2008 | Stachowiak | 428/428 |
| 7,846,492 B2 * | 12/2010 | Veerasamy et al. | 427/165 |
| 8,420,207 B2 | 4/2013 | Reutler et al. | |
| 2002/0114945 A1 * | 8/2002 | Greenberg et al. | 428/336 |
| 2002/0192473 A1 * | 12/2002 | Gentilhomme et al. | 428/432 |
| 2003/0235720 A1 * | 12/2003 | Athey et al. | 428/702 |
| 2004/0005466 A1 | 1/2004 | Arai et al. | |
| 2005/0079369 A1 * | 4/2005 | Stachowiak | 428/469 |
| 2006/0029813 A1 * | 2/2006 | Kutilek et al. | 428/426 |
| 2006/0057298 A1 * | 3/2006 | Krisko et al. | 427/402 |
| 2006/0172138 A1 * | 8/2006 | Stachowiak | 428/432 |
| 2007/0111012 A1 * | 5/2007 | Rimmer et al. | 428/432 |
| 2007/0264494 A1 * | 11/2007 | Krisko et al. | 428/336 |
| 2008/0124460 A1 * | 5/2008 | Athey et al. | 427/165 |
| 2008/0248291 A1 * | 10/2008 | Athey et al. | 428/333 |
| 2008/0261035 A1 * | 10/2008 | Grimal et al. | 428/336 |
| 2009/0136765 A1 * | 5/2009 | Maschwitz et al. | 428/432 |
| 2011/0027554 A1 * | 2/2011 | Gouardes et al. | 428/213 |

FOREIGN PATENT DOCUMENTS

| | | |
|---|---|---|
| EP | 0 825 478 | 2/1998 |
| EP | 1 074 525 | 2/2001 |
| EP | 1 300 374 | 4/2003 |
| JP | 64-005930 A | 1/1989 |
| JP | 10-278165 A | 10/1998 |
| WO | 2009 106864 | 9/2009 |

OTHER PUBLICATIONS

International Search Report Issued Apr. 27, 2011 in PCT/FR10/051852 Filed Sep. 7, 2010.

* cited by examiner

*Primary Examiner* — David Sample
*Assistant Examiner* — Lauren Colgan
(74) *Attorney, Agent, or Firm* — Oblon, McClelland, Maier & Neustadt, L.L.P.

(57) ABSTRACT

The subject of the invention is a material comprising a glass substrate coated on at least one of its faces with a thin-film multilayer comprising, starting from said substrate, at least one lower dielectric layer, at least one functional layer made of a metal or metal nitride, at least one upper dielectric layer and at least one layer of titanium oxide at least partially crystallized in the anatase form, said metal or metal nitride being based on Nb, NbN, W, WN, Ta, TaN or any of their alloys or solid solutions.

19 Claims, No Drawings

MATERIAL AND GLAZING COMPRISING SAID MATERIAL

The invention relates to the field of materials comprising a glass substrate coated with a photocatalytic layer.

Photocatalytic layers, especially those based on titanium oxide, are known to give self-cleaning and antisoiling properties to substrates coated therewith. Two properties are at the root of these advantageous characteristics. Firstly, titanium oxide is photocatalytic, that is to say it is capable under suitable radiation, generally ultraviolet radiation, to catalyze reactions in which organic compounds are degraded. This photocatalytic activity is initiated within the layer by the creation of an electron-hole pair. Furthermore, titanium oxide has an extremely pronounced hydrophilicity when it is irradiated by this same type of radiation. This strong hydrophilicity enables mineral soiling to be removed under running water, for example rainwater. Such materials, in particular on glazing, are described for example in patent application EP-A-0 850 204.

Glazing combining such self-cleaning and antisoiling properties with solar-control properties are known. The term "solar control" is understood to mean the capability of reducing the amount of solar energy liable to pass through windows and to heat up the rooms of dwellings and passenger compartments of vehicles. Windows provided with such properties make it possible to prevent excessive overheating of the above-mentioned rooms or passenger compartments and, where appropriate, limit the energy consumption associated with their air conditioning. It is thus known from patent application WO 03/050056 to deposit photocatalytic layers on tinted glass, however, tinted glass has a low selectivity, which corresponds to the ratio of light transmission to energy transmission. There are also what are commonly called "dual-coated" windows comprising a photocatalytic layer on one face and a solar-control coating on the other face. The advantage of such an arrangement is that the solar-control coating, which often has poor weatherability, is protected by being located on face 2 of the window, and therefore inside the building, whereas the photocatalytic coating is on face 1, on the outside of the building, where it is most useful. However, such glazing entails conversion difficulties since the layer or the multilayer deposited on the lower face runs the risk of being damaged during the conveying steps, especially because of contacts with the conveying rollers. It would therefore be useful to be able to provide glazing having on the same face, therefore face 1, both the solar-control functionality and the self-cleaning functionality. Attempts at solving this problem have however proved to be in vain hitherto because of the poor weatherability of the multilayers obtained.

A first object of the invention is to provide photocatalytic materials that can be incorporated into solar-control glazing which do not have the above-mentioned drawbacks. A second object of the invention is to provide solar-control glazing exhibiting excellent weatherability according to the EN 1096-2 (2001) standard. A third object of the invention is to provide materials with a neutral tint in transmission and/or in reflection.

These objects are achieved by a material comprising a glass substrate coated on at least one of its faces with a thin-film multilayer comprising, starting from said substrate, at least one lower dielectric layer, at least one functional layer made of a metal or metal nitride, at least one upper dielectric layer and at least one layer of titanium oxide at least partially crystallized in the anatase form, said metal or metal nitride being based on Nb, NbN, W, WN, Ta, TaN or any of their alloys or solid solutions.

The metals or nitrides chosen, in combination with the dielectric layers and the titanium oxide layer, surprisingly make it possible to obtain excellent weatherability and to meet the requirements of the EN 1096-2 (2001) standard, even after 56 days of testing. As a consequence, such glazing may be placed so that the multilayer is on face 1, that is to say on the outside of the building, where the photocatalytic layer may fully play its role with respect to soiling and atmospheric pollution. This combination therefore makes it possible to provide glazing that possesses both self-cleaning and anti-soiling properties and solar-control properties, but not having the drawbacks of the "dual-coated" glazing known from the prior art.

Preferably, the substrate is a glass sheet. The sheet may be flat or curved and have any dimensions, especially greater than 1 meter. The glass is preferably of the soda-lime-silica type, but other types of glass, such as borosilicate glass or aluminosilicate glass may also be used. The glass may be clear or extra clear, or it may be tinted, for example tinted blue, green, amber, bronze or gray. The thickness of the glass sheet is typically between 0.5 and 19 mm, especially between 2 and 12 mm or indeed between 4 and 8 mm.

The thin-film multilayer preferably does not comprise silver or copper layers as these layers run the risk of giving the glazing poor weather resistance, this being particularly prejudicial when the multilayer has to be placed on face 1 of the glazing.

The best results, particularly in terms of weatherability, are obtained when the metal or metal nitride is chosen from NbN, Nb, WN and W. These metals or nitrides also have good absorption properties in the visible and the infrared ranges. The thickness of the metal or metal nitride layer is to be adapted depending on the intended light transmission. Typically it varies between 3 and 50 nm, especially between 5 and 30 nm, or even between 5 and 20 nm. The light transmission of the material is preferably between 5 and 70%, especially between 10 and 60%.

The or each lower dielectric layer is intended to protect the metal or nitride layer from the diffusion of alkali metal ions from the substrate and to protect it from oxidation and delamination. Preferably, one or two upper dielectric layers are used. The or each upper dielectric layer is intended to reduce the intrinsic reflection of the metal or nitride layer and to protect the latter from corrosion and mechanical attack (scratching, abrasion, etc.). Preferably, the at least one lower dielectric layer and/or the at least one upper dielectric layer is chosen from silicon oxide, nitride or oxinitride, aluminum oxide, nitride or oxinitride, tin oxide and a mixed tin zinc oxide. Silicon nitride is preferred as it provides excellent mechanical and tempering resistance and can be easily deposited by magnetron sputtering. Each of these layers may be a pure layer or a doped layer. It is thus frequent to dope the silica or silicon nitride layers with an atom such as aluminum, so as to facilitate their sputter deposition. The thickness of the or each lower dielectric layer and/or the or each upper dielectric layer is preferably between 5 and 100 nm, especially between 10 and 50 nm.

When the functional layer is metallic, especially a niobium or niobium-based layer, it is preferable to interpose a blocker layer between the functional layer and the upper dielectric layer closest to the functional layer, or also between the functional layer and the lower dielectric layer closest to the functional layer. This blocker layer is intended to prevent the oxidation or nitriding of the functional metallic layer during possible heat treatments, for example during tempering. This blocker layer is very thin, preferably between 1 and 5 nm in thickness. Preferably, it is made of a metal chosen from titanium, chromium, and a nickel-chromium alloy. The presence of one or more blocker layers makes the multilayer temperable when the functional layer is made of metal, by which it is meant that the multilayer has similar optical properties before and after tempering.

The functional layer, especially when it is a nitride layer, may itself be surmounted by an additional nitride layer, for example made of niobium nitride, titanium nitride, zirconium nitride or chromium nitride. This additional layer may possibly enable the reflection properties, especially the chromatic values, to be more easily adjusted.

Preferably, at least one silica layer is interposed between the at least one upper dielectric layer and the at least one titanium oxide layer at least partially crystallized in the anatase form and/or between the substrate and the lower dielectric layer closest to the substrate. This additional layer makes it possible to improve the photocatalytic activity of the coating. In the second alternative, the color variations in reflection of the multilayer due to any possible variations in thickness of the silica layer are minimized. In the first alternative, however, the thickness and the homogeneity of the silica layer must be perfectly controlled in order for the color in reflection of the multilayer to be properly controlled. The or each silica layer preferably has a thickness of between 5 and 100 nm, especially between 10 and 40 nm. The silica layer may be a pure or doped layer, for example doped with aluminum atoms.

The preferred multilayers are the following:
glass/$Si_3N_4$/NbN/$Si_3N_4$/$TiO_2$;
glass/$Si_3N_4$/NbN/$Si_3N_4$/$SiO_2$/$TiO_2$;
glass/$SiO_2$/$Si_3N_4$/NbN/$Si_3N_4$/$TiO_2$;
glass/$SiO_2$/$Si_3N_4$/NbN/$Si_3N_4$/$SiO_2$/$TiO_2$;
glass/$Si_3N_4$/WN/$Si_3N_4$/$TiO_2$;
glass/$Si_3N_4$/WN/$Si_3N_4$/$SiO_2$/$TiO_2$;
glass/$SiO_2$/$Si_3N_4$/WN/$Si_3N_4$/$TiO_2$;
glass/$SiO_2$/$Si_3N_4$/WN/$Si_3N_4$/$SiO_2$/$TiO_2$;
glass/$Si_3N_4$/Ti/Nb/Ti/$Si_3N_4$/$TiO_2$;
glass/$Si_3N_4$/Ti/Nb/Ti/$Si_3N_4$/$SiO_2$/$TiO_2$;
glass/$SiO_2$/$Si_3N_4$/Ti/Nb/Ti/$Si_3N_4$/$TiO_2$;
glass/$SiO_2$/$Si_3N_4$/Ti/Nb/Ti/$Si_3N_4$/$SiO_2$/$TiO_2$.

In these nonlimiting examples of multilayers according to the invention, the titanium blocker layer may be replaced with a chromium layer. The thickness ranges for the various layers of the multilayer are those given above and are not repeated here so as not to burden the text.

The titanium oxide may be pure or doped titanium oxide, for example doped with transition metals (for example W, Mo, V, Nb), with lanthanide ions or with noble metals (such as for example platinum or palladium), or else with nitrogen or carbon atoms. These various forms of doping make it possible either to increase the photocatalytic activity of the material or to shift the bandgap of titanium oxide toward wavelengths close to the visible range or within this range.

The titanium oxide layer is normally the last layer of the multilayer deposited on the substrate, in other words that layer of the multilayer furthest away from the substrate. This is because it is important for the photocatalytic layer to be in contact with the atmosphere and its pollutants. However, it is possible to deposit a very thin, generally discontinuous or porous, layer on the photocatalytic layer. This very thin layer may for example be a layer based on noble metals intended to increase the photocatalytic activity of the material. It may also be a thin hydrophilic layer, for example made of silica, as taught in patent applications WO 2005/040058 and 2007/045805.

The thickness of the titanium oxide layer is preferably between 5 and 50 nm, especially between 5 and 20 nm.

The use of a multilayer on just one face of the substrate makes it possible for the deposition process to be considerably simplified, for the cost thereof to be reduced and for the risks of damaging the layers during conveying or handling to be avoided.

The material according to the invention preferably has an energy transmission (according to the NF EN 410 (1998)) standard of between 2 and 70%, especially between 5 and 65%.

Another subject of the invention is a process for obtaining a material in which the layers of the multilayer are deposited by magnetron sputtering or chemical vapor deposition (CVD).

In the sputtering process, especially a magnetron sputtering process, excited species of a plasma tear off the atoms of a target placed facing the substrate to be coated. To deposit the titanium oxide layer, the target may especially be made of metallic titanium or $TiO_x$, the plasma having to contain oxygen (the process is referred to as reactive sputtering). It is also possible to deposit $Si_3N_4$ or $SiO_2$ layers using an aluminum-doped silicon target in a plasma containing argon and nitrogen or argon and oxygen respectively. The functional layer made of a metal or nitride may be deposited using a metal target, in an inert atmosphere (for example argon) or in a reactive atmosphere containing nitrogen, respectively.

Chemical vapor deposition, generally denoted by the acronym CVD, is a pyrolysis process based on gaseous precursors that decompose under the effect of the heat of the substrate. In the case of titanium oxide, the precursors may for example be titanium tetrachloride, titanium tetraisopropoxide or titanium tetraortho-butoxide.

The deposition step is preferably followed by a heat treatment, especially of the tempering, bending or annealing type, or by a rapid treatment using laser radiation or a flame, especially when the titanium oxide layer has been deposited by sputtering. This heat treatment is intended to crystallize the titanium oxide in the anatase form. The rapid treatment is preferably a treatment as described in patent application WO 2008/096089.

Another subject of the invention is glazing comprising at least one material according to the invention. The glazing may be single glazing or multiple glazing (especially double or triple glazing) by which it is meant that it may comprise several glass sheets thereby providing a gas-filled space. The glazing may also be laminated and/or tempered and/or toughened and/or bent. In the case of single or multiple glazing, the solar-control coating is preferably deposited on face 1.

The solar-control glazing thus obtained also has self-cleaning, antisoiling and antifogging properties and provides better vision in rainy weather. When the functional layer is made of a metal, for example Nb, the emissivity of the multilayer is thereby reduced, typically to values of 0.5 or less, or even 0.3. The multilayer therefore has both solar-control and low-E (low-emissivity) properties. When the multilayer is deposited on face 1, the latter property is particularly advantageous for limiting the condensation (fogging and/or frosting) on the surface of double-glazing, in particular when it is inclined (for example integrated into roofs or porches). The presence of a low-E layer on face 1 makes it possible to limit the heat exchange with the outside overnight, and therefore to maintain a glass surface temperature above the dew point. The appearance of fogging or frosting is therefore greatly reduced or even completely eliminated.

In the case of single glazing, the multilayer may also be deposited on face 2, providing ease of cleaning and antifogging properties.

The other face of the substrate coated according to the invention, or where appropriate a face of another substrate of the multiple glazing, may be coated with another functional layer or with a multilayer comprising functional layers. There may especially be another photocatalytic layer, for example another multilayer according to the invention. It may also be a layer or multilayer having a thermal function, especially a solar-control or low-E function, for example multilayers comprising a silver layer protected by dielectric layers. It may also be a mirror layer, especially based on silver. Finally, it may be a lacquer or enamel intended to opacify the glazing, for making therefrom a wall cladding panel, also called spandrel glass. The spandrel glass is placed as curtain walling beside non-opacified glazing and makes it possible to obtain entirely glazed walls that are uniform from the esthetic standpoint.

Finally, the subject of the invention is the use of glazing according to the invention as solar-control glazing for buildings or vehicles (terrestrial, airborne or railway vehicles). The glazing according to the invention is preferably used on face 1, by which it is meant that the multilayer is placed on the outside of the building or vehicle. In the case of applications in the building field, the glazing is preferably employed as porches, as curtain walling or roofs. For automotive applications, the glazing may advantageously form roofs.

The invention will be better understood in the light of the following nonlimiting examples.

All the examples, whether comparative or according to the invention, are produced by magnetron sputtering deposition on clear glass substrates sold under the brand name "Planilux" by the Applicant.

The silicon nitride layers are obtained using a silicon target doped with 8% aluminum by weight in an atmosphere composed of 45% argon and 55% nitrogen. The niobium layers are obtained from a niobium target in an argon atmosphere. The niobium nitride layers make use of the same type of target, but in an atmosphere composed of 45% argon and 55% nitrogen. The titanium layers are obtained using a titanium target in an argon atmosphere. The titanium oxide layers themselves are obtained either from a titanium target in an atmosphere composed of argon and oxygen, or from a target made of substoichiometric titanium oxide in an argon atmosphere enriched with 1% oxygen. The silica layers are obtained using a silicon target doped with 8% aluminum by weight in an atmosphere composed of 75% argon and 25% oxygen.

1ST SERIES OF EXAMPLES

Table 1 shows the composition and the thickness of comparative example C1 and examples 1 to 5 according to the invention. The multilayer was produced in the order of the table, the first row corresponding to the layer furthest away from the substrate and the last row to that in contact with the substrate. As in the rest of the description, the thicknesses are physical thicknesses expressed in nm.

TABLE 1

|  | C1 | 1 | 2 | 3 | 4 | 5 |
|---|---|---|---|---|---|---|
| $TiO_2$ | 0 | 10 | 10 | 10 | 10 | 10 |
| $SiO_2$ | 0 | 0 | 0 | 23 | 20 | 10 |
| $Si_3N_4$ | 31 | 31.1 | 18 | 18 | 0 | 5 |
| NbN | 6.6 | 6.6 | 6.8 | 6.8 | 7.0 | 7.0 |
| $Si_3N_4$ | 11.3 | 11.3 | 12 | 12 | 20 | 20 |

Table 2 below gives the optical properties of comparative example C1 and examples 1 to 5 according to the invention. The properties are:
- the light transmission ($T_L$), the light reflection on the glass side ($R_{L(g)}$), the light reflection on the multilayer side ($R_{L(m)}$) and the energy transmission ($T_E$) according to the NF EN 410 (1998) standard; and
- the corresponding chromatic values L*, a* and b* (in transmission and in reflection on the glass side and the multilayer side), calculated under illuminant D65 and with the reference observer CIE-1931.

TABLE 2

|  | C1 | 1 | 2 | 3 | 4 | 5 |
|---|---|---|---|---|---|---|
| $T_L$ (%) | 50.2 | 54.2 | 51.7 | 57.2 | 55.2 | 51.1 |
| L* | 76.2 | 78.6 | 77.1 | 80.3 | 79.2 | 76.7 |
| a* | −1.5 | −1.4 | −1.3 | −1.6 | −1.2 | −1.3 |
| b* | −1.8 | −2.1 | −1.6 | 3.3 | 2.0 | 2.7 |
| $R_{L(m)}$ (%) | 16.7 | 14.0 | 17.3 | 8.9 | 15.4 | 17.4 |
| L* | 47.8 | 44.3 | 48.6 | 35.8 | 46.2 | 48.8 |
| a* | 0.6 | 0.6 | 0.6 | 1.5 | −0.7 | 0.1 |
| b* | 0.7 | 1.9 | −0.3 | 11.8 | 4.0 | 2.1 |
| $R_{L(g)}$ (%) | 17.0 | 25.3 | 19.9 | 20.8 | 16.8 | 15.8 |
| L* | 48.2 | 57.3 | 51.7 | 52.8 | 48.0 | 46.6 |
| a* | −1.1 | −2.8 | 1.2 | −3.1 | −1.9 | −1.0 |
| b* | −9.8 | −8.1 | 11.1 | −3.2 | −8.0 | 9.5 |
| $T_E$ (%) | 45.3 | 49.0 | 47.6 | 50.9 | 50.2 | 46.0 |

The specimens of examples C1 and 1 to 5 were then subjected to an annealing treatment at a temperature of 620° C. for 10 minutes.

Table 3 below indicates the optical properties of comparative example C1 and examples 1 to 5 according to the invention after this annealing treatment. It also indicates the color changes in transmission and in reflection caused by the annealing. These changes are expressed by the quantity ΔE* (which corresponds to the square root of the sum of the squares of the differences in chromatic values before and after annealing). The subscripts t, g and m correspond to transmission, reflection on the glass side and reflection on the multilayer side, respectively.

TABLE 3

|  | C1 | 1 | 2 | 3 | 4 | 5 |
|---|---|---|---|---|---|---|
| $T_L$ (%) | 51.6 | 54 | 51.4 | 56.6 | 56.9 | 50.4 |
| L* | 77.0 | 78.4 | 76.9 | 79.9 | 80.1 | 76.3 |
| a* | −1.6 | −1.9 | −1.8 | −2.0 | −1.4 | −1.5 |
| b* | −2.4 | −2.8 | −2.9 | −3.9 | −2.9 | −3.5 |
| $R_{L(m)}$ (%) | 15.6 | 11.9 | 15.3 | 6.8 | 14.5 | 16.4 |
| L* | 46.5 | 41.1 | 46.0 | 31.3 | 44.9 | 47.5 |
| a* | 1.2 | 2.0 | 1.7 | 3.8 | 0.3 | 0.8 |
| b* | 0.4 | 0.0 | 0.1 | 8.8 | 3.7 | 2.9 |
| $R_{L(g)}$ (%) | 15.4 | 24.7 | 19.2 | 20.6 | 16.5 | 15.4 |
| L* | 46.2 | 56.8 | 50.9 | 52.5 | 47.6 | 46.2 |
| a* | 0.7 | −2.8 | −0.9 | −3.1 | −1.4 | −0.6 |
| b* | −9.6 | −8.1 | −11.5 | −3.1 | −8.2 | −10.1 |
| $T_E$ (%) | 46.2 | 47.6 | 45.9 | 49.1 | 51.8 | 44.8 |
| $\Delta E^*_t$ | 1.0 | 0.9 | 1.4 | 0.9 | 1.3 | 0.9 |
| $\Delta E^*_m$ | 1.5 | 3.9 | 2.9 | 5.8 | 1.7 | 1.6 |
| $\Delta E^*_g$ | 2.8 | 0.5 | 0.9 | 0.2 | 0.6 | 0.8 |

The low ΔE* values show that the colorimetric properties of the multilayers do not change significantly due to the annealing treatment.

The photocatalytic activity of comparative specimen C1 and specimens 1 to 5 according to the invention was measured according to the following test.

An aqueous solution of methylene blue was placed in contact in a sealed cell with the coated substrate (the latter forming the bottom of the cell). After exposure to ultraviolet radiation for 30 minutes, the methylene blue concentration was determined by measuring the light transmission. The photocatalytic activity, expressed in $g \cdot l^{-1} \cdot min^{-1}$, corresponded to the reduction in methylene blue concentration per unit of exposure time.

Table 4 below reproduces the results obtained.

TABLE 4

|  | Photocatalytic activity |
|---|---|
| C1 | 0 |
| 1 | 15 |
| 2 | 21 |
| 3 | 30 |
| 4 | 34 |
| 5 | 32 |

The presence of a silica layer between the second dielectric layer and the photocatalytic layer therefore makes it possible to increase the photocatalytic activity of the coating substantially. SIMS (secondary-ion mass spectroscopy) analysis confirmed that the amount of sodium in the photocatalytic layer is much lower when the silica layer is present.

2ND SERIES OF EXAMPLES

Table 5 shows the composition and the thickness of comparative example C2 and examples 6 and 7 according to the invention. The multilayer was produced in the order of the table, the first row corresponding to the layer furthest away from the substrate and the last row to that in contact with the substrate. As in the rest of the description, the thicknesses are physical thicknesses expressed in nm.

TABLE 5

|  | C2 | 6 | 7 |
|---|---|---|---|
| $TiO_2$ | 0 | 11.6 | 11.6 |
| $SiO_2$ | 0 | 10.6 | 10.6 |
| $Si_3N_4$ | 31 | 11 | 5.3 |
| NbN | 7.0 | 7.4 | 7.4 |
| $Si_3N_4$ | 11 | 10 | 10 |

Specimens C2 and 6 and 7 were subjected to a tempering treatment. The optical properties of these specimens after tempering are collated in Table 6.

TABLE 6

|  | C2 | 6 | 7 |
|---|---|---|---|
| $T_L$ (%) | 51.4 | 52.5 | 51.5 |
| L* | 76.9 | 77.6 | 77.0 |
| a* | −1.5 | −1.8 | −1.8 |
| b* | 0.2 | −2.0 | −1.9 |
| $R_{L(m)}$ (%) | 16.9 | 14.4 | 15.4 |
| L* | 48.1 | 44.8 | 46.2 |
| a* | 0.4 | 0.6 | 0.7 |
| b* | 0.9 | 4.0 | 2.7 |
| $R_{L(g)}$ (%) | 18.5 | 17.6 | 15.4 |
| a* | −1.1 | −2.0 | −1.4 |
| b* | −9.6 | −11.1 | −11.6 |

The tempered specimens C2, 6 and 7 were subjected to various weatherability tests described in the EN 1096-2 (2001) standard. These were the following tests:
  condensation resistance according to Annex B of the EN 1096-2 (2001) standard, denoted by "HH";
  acid attack resistance according to Annex C of the aforementioned standard, denoted by "$SO_2$"; and
  neutral salt fog resistance according to Annex D of the aforementioned standard, denoted by "NSF".

Table 7 indicates the results in terms of visual check, colorimetric changes and light reflection and transmission after 56 days of testing. In the "visual check" rows, "OK" indicates a success—no defects —, while "NOK" indicates a failure.

TABLE 7

|  |  | C2 | 6 | 7 |
|---|---|---|---|---|
| NSF | Visual check | NOK | OK | OK |
|  | $\Delta E^*_m$ | 1.7 | 0.2 | 0.6 |
|  | $\Delta R_{L(m)}$ | 1.1 | 0.2 | 0.4 |
|  | $\Delta T_L$ | 0.7 | 0.1 | 0.3 |
| HH | Visual check | NOK | OK | OK |
|  | $\Delta E^*_m$ | 0.4 | 0.4 | 0.4 |
|  | $\Delta R_{L(m)}$ | 0.1 | 0.1 | 0.3 |
|  | $\Delta T_L$ | 0.3 | 0.2 | 0.4 |
| $SO_2$ | Visual check | OK | OK | OK |
|  | $\Delta E^*_m$ | 0.4 | 0.5 | 0.5 |
|  | $\Delta R_{L(m)}$ | 0.2 | 0.2 | 0.3 |
|  | $\Delta T_L$ | 0.2 | 0.2 | 0.2 |

The tempered specimens C2, 6 and 7 were also subjected to an accelerated ageing test consisting in immersing them in boiling demineralized water for two hours. The colorimetric changes due to such a treatment are given in Table 8.

TABLE 8

|  | C2 | 6 | 7 |
|---|---|---|---|
| $\Delta T_L$ | 0.40 | 0.08 | 0.08 |
| $\Delta E^*_t$ | 0.35 | 0.04 | 0.05 |
| $\Delta R_{L(m)}$ | 0.61 | 0.10 | 0.03 |
| $\Delta E^*_m$ | 1.03 | 0.16 | 0.06 |
| $\Delta R_{L(g)}$ | 0.61 | 0.10 | 0.03 |
| $\Delta E^*_g$ | 1.03 | 0.16 | 0.06 |

The multilayers according to the invention generally have better weather resistance than the comparative multilayer, especially in the boiling-water accelerated test and the condensation and neutral salt fog resistance tests. The titanium oxide layer, in addition to imparting photocatalytic properties, therefore considerably improves the weatherability of the glazing according to the invention, enabling the multilayer to be positioned on face 1.

In comparison, solar-control layers comprising a silver layer between several silicon nitride layers and covered with a titanium oxide layer do not pass the NSF, HH and $SO_2$ tests, even after 21 days of testing.

3RD SERIES OF EXAMPLES

Table 9 shows the composition and the thickness of comparative example C3 and example 8 according to the invention. The multilayer was produced in the order of the table, the first row corresponding to the layer furthest away from the substrate and the last row to that in contact with the substrate. As in the rest of the description, the thicknesses are physical thicknesses expressed in nm.

TABLE 9

|  | C3 | 8 |
|---|---|---|
| $TiO_2$ | 0 | 5 |
| $Si_3N_4$ | 45 | 38 |

TABLE 9-continued

|  | C3 | 8 |
|---|---|---|
| Ti | 1 | 1 |
| Nb | 19 | 19 |
| Ti | 1 | 1 |
| $Si_3N_4$ | 40 | 40 |

Table 10 collates the colorimetric and energy properties of example C3 and example 8 after tempering. The term "$T_E$" corresponds to the energy transmission according to the NF EN 410 (1998) standard.

TABLE 10

|  | C3 | 8 |
|---|---|---|
| $T_L$ (%) | 26.2 | 27.3 |
| $T_E$ (%) | 18.7 | 19.4 |
| L* | 58.3 | 59.2 |
| a* | −4.3 | −4.6 |
| b* | 4.3 | 3.4 |
| $R_{L(m)}$ (%) | 10.2 | 10.3 |
| L* | 38.3 | 38.4 |
| a* | 16.0 | 16.5 |
| b* | −7.8 | −4.7 |
| $R_{L(g)}$ (%) | 27.4 | 26.7 |
| L* | 59.4 | 58.7 |
| a* | −3.0 | −3.3 |
| b* | 2.6 | 1.6 |

The specimens as such and tempered were subjected to an accelerated ageing test consisting in immersing them in boiling demineralized water for two hours. The colorimetric changes due to such a treatment are given in Table 11.

As beforehand in the text, these changes are expressed by the quantity ΔE* (which corresponds to the square root of the sum of the squares of the differences in chromatic values L*, a* and b* before and after annealing). The subscripts t, g and m correspond to transmission, reflection on the glass side and reflection on the multilayer side, respectively.

TABLE 11

|  | C3 | 8 |
|---|---|---|
|  | non-tempered | |
| $ΔE^*_t$ | 6.7 | 0.1 |
| $ΔE^*_m$ | 36.0 | 0.2 |
| $ΔE^*_g$ | 5.3 | 0.1 |
|  | Tempered | |
| $ΔE^*_t$ | 4.7 | 0.2 |
| $ΔE^*_m$ | 28.4 | 0.3 |
| $ΔE^*_g$ | 3.6 | 0.1 |

The comparative specimen showed very strong degradation in appearance, especially in reflection on the multilayer side, whereas the specimen according to the invention showed no modification in its optical properties.

The specimens were also subjected to the NSF (neutral salt fog) resistance test described in Annex D of the EN 1096-2 (2001) standard. The colorimetric change in reflection, on the glass side and the multilayer side, is indicated in Table 12.

TABLE 12

|  | C3 | 8 |
|---|---|---|
| $ΔE^*_g$ | 3.7 | 0.1 |
| $ΔE^*_m$ | 33.4 | 0.7 |

Here again, the comparative specimen shows a very great modification in appearance, in contrast to the specimen according to the invention.

The excellent weatherability conferred by the photocatalytic layer enables the solar-control glazing to be used on face 1, therefore having the multilayer on the outside of the building.

Furthermore, example 8 has a normal emissivity according to the EN 12898 standard of 0.2, whether before or after tempering. This low emissivity makes it possible to limit the cooling of the external surface of the glazing overnight and consequently to reduce or eliminate condensation (fogging and/or frosting) when the multilayer is placed on face 1 of the glazing. This effect is particularly pronounced in the case of inclined double glazing, for example on roofs or porches.

4TH SERIES OF EXAMPLES

Table 13 shows the composition and the thickness of examples 9 to 12. The multilayer was produced in the order of the table, the first row corresponding to the layer furthest away from the substrate and the last row to that in contact with the substrate. As in the rest of the description, the thicknesses are physical thicknesses expressed in nm.

TABLE 13

|  | 9 | 10 | 11 | 12 |
|---|---|---|---|---|
| $TiO_2$ | 15 | 10 | 10 | 10 |
| $SiO_2$ | 0 | 0 | 0 | 20 |
| $Si_3N_4$ | 10 | 10 | 20 | 20 |
| NbN | 6 | 6 | 7 | 7 |
| $Si_3N_4$ | 11 | 11 | 11 | 11 |
| $SiO_2$ | 0 | 0 | 20 | 0 |

Table 14 collates the colorimetric and energy properties of examples 9 and 10. The terms "$T_E$", "$R_E$" and "SF" correspond to the energy transmission, to the energy reflection and the solar factor, respectively, according to the NF EN 410 (1998) standard.

TABLE 14

|  | 9 | 10 |
|---|---|---|
| $T_L$ (%) | 51.5 | 51.2 |
| L* | 77 | 76.8 |
| a* | −1.1 | −1.0 |
| b* | 0 | 0 |
| $R_{L(m)}$ (%) | 18.1 | 18.4 |
| L* | 49.6 | 50 |
| a* | 0.5 | 0.3 |
| b* | −1 | −1 |
| $R_{L(g)}$ (%) | 19.2 | 15 |
| L* | 50.9 | 45.6 |
| a* | −0.8 | −0.4 |
| b* | −12.1 | −10.9 |
| $T_E$ (%) | 49.0 | 48.8 |
| $R_E$ (%) | 18.4 | 18.6 |
| SF | 0.581 | 0.581 |

Multilayers 9 and 10 have a particularly neutral tint in reflection on the multilayer side.

Table 15 shows the optical properties of examples 11 and 12. The ΔE* value corresponds here to the change in color in reflection on the multilayer side due to a thickness variation of ±10% relative to the $SiO_2$ layer.

TABLE 15

| | 11 | 12 |
|---|---|---|
| $T_L$ (%) | 49.9 | 54.7 |
| L* | 76.0 | 78.9 |
| a* | −1.1 | −1.5 |
| b* | −1.3 | −2.5 |
| $R_{L(m)}$ (%) | 15.7 | 8.3 |
| L* | 46.6 | 34.5 |
| a* | 0.6 | 2.6 |
| b* | 3.8 | 16.6 |
| $R_{L(g)}$ (%) | 20.8 | 21.9 |
| L* | 52.7 | 53.9 |
| a* | −1.4 | −3.3 |
| b* | −10.6 | −2.0 |
| $T_E$ (%) | 47.2 | 50.8 |
| ΔE* | 0.1 | 3.7 |

By comparing the ΔE* values it is clear that placing the silica layer in contact with the glass substrate makes it possible to minimize the color variations in reflection due to possible thickness variations of this same silica layer. In contrast, when the silica layer is placed beneath the photocatalytic layer, any modification in its thickness results in a large color variation.

The invention claimed is:

1. A building or a vehicle comprising a solar-control glazing comprising a material comprising a glass substrate coated on at least one of its faces with a thin-film multilayer comprising, starting from said substrate:
    a lower dielectric layer;
    a functional layer comprising a metal or metal nitride, wherein said metal or metal nitride comprises Nb, NbN, W, WN, Ta, TaN, or any of their alloys or solid solutions;
    an upper dielectric layer selected from the group consisting of silicon oxide, silicon nitride, silicon oxinitride, aluminum oxide, aluminum nitride, aluminum oxinitride, tin oxide, and a mixed tin zinc oxide; and
    a layer of titanium oxide at least partially crystallized in the anatase form, wherein the layer of titanium dioxide is directly on the upper dielectric layer or directly on a layer consisting essentially of $SiO_2$ deposited over the upper dielectric layer,
    wherein the multilayer is situated on the outside of the building or vehicle.

2. The building or vehicle of claim 1, wherein the thin-film multilayer does not comprise a silver or copper layer.

3. The building or a vehicle of claim 1, wherein a thickness of the functional layer varies between 3 and 50 nm.

4. The building or vehicle of claim 1, wherein the lower dielectric layer is selected from the group consisting of silicon oxide, silicon nitride, silicon oxinitride, aluminum oxide, aluminum nitride, aluminum oxinitride, tin oxide, and a mixed tin zinc oxide.

5. The building or vehicle of claim 1, wherein the functional layer is metallic and the multilayer further comprises a blocker layer which is interposed between the functional layer and an upper dielectric layer closest to the functional layer, and optionally also interposed between the functional layer and a lower dielectric layer closest to the functional layer.

6. The building or vehicle of claim 5, wherein the blocker layer comprises a metal selected from the group consisting of titanium, chromium, and a nickel-chromium alloy.

7. The building or vehicle of claim 1, further comprising a silica layer interposed between the substrate and a lower dielectric layer closest to the substrate.

8. The building or vehicle of claim 1, wherein the multilayer comprises constituents selected from the group consisting of:
    glass/$Si_3N_4$/NbN/$Si_3N_4$/$TiO_2$;
    glass/$SiO_2$/$Si_3N_4$/NbN/$Si_3N_4$/$TiO_2$;
    glass/$Si_3N_4$/WN/$Si_3N_4$/$TiO_2$;
    glass/$SiO_2$/$Si_3N_4$/WN/$Si_3N_4$/$TiO_2$;
    glass/$Si_3N_4$/Ti/Nb/Ti/$Si_3N_4$/$TiO_2$; and
    glass/$SiO_2$/$Si_3N_4$/Ti/Nb/Ti/$Si_3N_4$/$TiO_2$.

9. The building or vehicle of claim 1, wherein a thickness of the titanium oxide layer is between 5 and 50 nm.

10. The building or vehicle of claim 1, wherein a thickness of the functional layer varies between 5 and 30 nm.

11. The building or vehicle of claim 1, wherein a thickness of the titanium oxide layer is between 5 and 20 nm.

12. The building or vehicle of claim 1, wherein the upper dielectric layer is a silicon nitride layer.

13. The building or vehicle of claim 1, wherein the upper dielectric layer is directly on the functional layer.

14. The building or vehicle of claim 13, wherein a thickness of the titanium oxide layer is between 5 and 11.6 nm.

15. The building or vehicle of claim 1, wherein the multilayer comprises constituents selected from the group consisting of:
    glass/$Si_3N_4$/NbN/$Si_3N_4$/$SiO_2$/$TiO_2$;
    glass/$SiO_2$/$Si_3N_4$/NbN/$Si_3N_4$/$SiO_2$/$TiO_2$;
    glass/$Si_3N_4$/WN/$Si_3N_4$/$SiO_2$/$TiO_2$;
    glass/$SiO_2$/$Si_3N_4$/WN/$Si_3N_4$/$SiO_2$/$TiO_2$;
    glass/$Si_3N_4$/Ti/Nb/Ti/$Si_3N_4$/$SiO_2$/$TiO_2$; and
    glass/$SiO_2$/$Si_3N_4$/Ti/Nb/Ti/$Si_3N_4$/$SiO_2$/$TiO_2$.

16. A process for obtaining the building or a vehicle of claim 1, the process comprising:
    depositing layers of the multilayer by magnetron sputtering or by chemical vapor deposition, to obtain the thin-film multilayer;
    incorporating the thin-film multilayer into a solar-control glazing; and
    installing the solar-control glazing on the building or vehicle.

17. The process of claim 16, wherein the depositing is followed by a heat treatment.

18. The process of claim 16, wherein the depositing is followed by a tempering, bending or annealing type heat treatment.

19. The process of claim 16, wherein the depositing is followed by a rapid heat treatment with laser radiation or a flame.

* * * * *